Aug. 14, 1934.    F. CONRAD    1,969,779
MOTOR INTERFERENCE ELIMINATION SYSTEM
Filed June 17, 1931
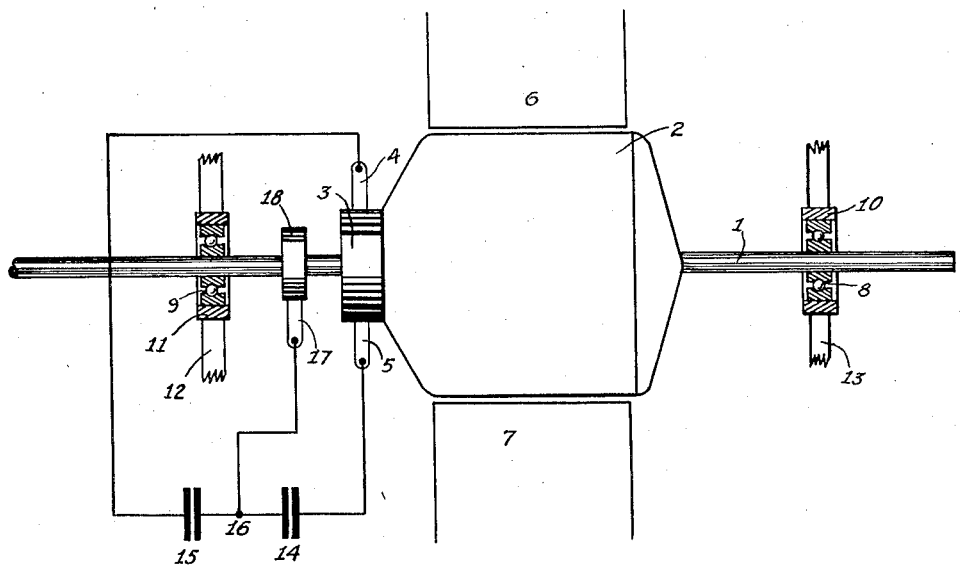
INVENTOR
FRIEDRICH CONRAD
BY
ATTORNEY Patented Aug. 14, 1934

1,969,779

UNITED STATES PATENT OFFICE 1,969,779

MOTOR INTERFERENCE ELIMINATION SYSTEM

Friedrich Conrad, Berlin-Charlottenburg, Germany, assignor to Siemens & Halske, Aktiengesellschaft, Siemensstadt, near Berlin, Germany, a corporation of Germany Application June 17, 1931, Serial No. 544,974
In Germany July 31, 1930

3 Claims. (Cl. 171—97)

The present invention relates broadly to a system for isolating electrical disturbances caused by electric motors and the like.

It is an object of this invention to prevent electrical disturbances emanating from electrical apparatus such as electric motors from affecting other electrical apparatus such as radio receivers.

Another object of the present invention is to provide a system as described above which is safe and economical.

Other objects of the invention will be apparent from the following detailed specification and claims.

Radio frequency disturbances or interference due to electrical apparatus such as motors and the like are produced in most instances by reason of the fact that in the case of motors the brushes thereof together with the field winding and the usual connecting wires on the one hand and the commutator, motor casing and ground connection on the other hand form a circuit which is readily excited at radio frequency by commutator sparking. It is quite evident that the various circuits described above may be easily coupled to nearby radio receiving apparatus, as for instance, through the leads or wires of the commercial current supply system from which the motor as well as the radio apparatus is energized. It is well known in the art that there have been devised a number of ways and means to suppress disturbances caused by commutator sparks and the like. These various devices attempt to suppress the disturbances without acting upon the source of the trouble or the path of the disturbances themselves. For instance, there is known in the art schemes for preventing variations of potential along a conductor, one of these schemes providing one or more capacitive short circuit paths between points of the system that are at different radio frequency potentials. It is also known that providing an active resistance in the line decreases the amplitude of the disturbing pulsations; however, the presence of such instances impedes or impairs the technical or operating efficiency of the equipment. Another well known method for eliminating disturbances due to sparking the point of symmetry of two series connected condensers disposed in parallel relationship to the motor brushes is connected with the motor casing. It is seen at once that in such a system, since the casing is usually accessible to bodily contact damage or injuries are liable to arise should one of the condensers break down.

According to the present invention the body of the armature is insulated from the housing, and the point of symmetry of the condensers designed to eliminate the disturbances is conductively united with the armature body. This conductive connection is most suitably established by way of a slip ring and a brush.

The single figure of the drawing shows diagrammatically an arrangement in accordance with the invention.

In the drawing, there is shown a motor in diagrammatic form as comprising a motor shaft 1 and an armature 2 fixed thereto together with the usual commutator 3 and brushes 4 and 5 associated with the commutator. The shaft 1 is supported on bearings 8 and 9 which are fitted into insulating rings or races 10 and 11 respectively. The insulating rings or races 10 and 11 are accommodated within the bearing boxes 12 and 13 respectively as shown. In parallel relationship to the brushes 4 and 5 there are provided two protective condensers 14 and 15. The point 16 between the two condensers 14 and 15 which is herein referred to as the point of symmetry is associated with a brush 17 disposed so as to frictionally engage slip ring 18. The slip ring 18 is also mounted on the shaft 1 and adapted to be rotated thereby. It should be noted, however, that the ring 18 is directly connected to the shaft and the other metallic parts of the armature so that high frequency oscillations generated by any sparking caused by the brushes 4 and 5 and commutator 3 are caused to traverse paths associated with the motor assembly. Thus, there is formed a high frequency circuit for each brush and the motor assembly including the armature structure.

It will be obvious to anyone skilled in the art that the high frequency disturbances are localized within this circuit and thus prevented from being communicated to another device.

While only one specific modification of the invention has been shown and described, it is to be understood that such procedure was obviously followed only for the sake of simplicity, and it is intended that this patent be limited only by the scope of the appended claims.

I claim:

1. In an electric motor assembly, means for isolating electrical disturbances caused thereby comprising, means for insulating the motor shaft from the motor housing, a circuit comprising a pair of capacities in series connected across the motor brushes and means for conductively connecting the common terminal of said capacities with said motor shaft.

2. In an electric motor assembly, means for isolating electrical disturbances caused thereby comprising, means for insulating the motor shaft from the motor housing and individual circuits including condensers connected from each brush to said motor shaft.

3. In a motor assembly which includes an electric motor provided with a commutator and brush arrangement the operation of which causes sparking of such a character that high frequency electrical disturbances are caused to traverse various paths associated with the motor assembly, a circuit including a pair of capacity elements shunted across the brushes of said motor, means for insulating the armature structure of the motor including the motor shaft from the motor casing and means for conductively connecting a point intermediate said two capacity elements to said armature structure for forming a high frequency circuit for each brush whereby the high frequency disturbances are in effect localized therein and thereby substantially prevented from being communicated to the motor assembly associated circuits.

FRIEDRICH CONRAD.